United States Patent [19]

Namioka

[11] Patent Number: 5,077,754
[45] Date of Patent: Dec. 31, 1991

[54] TAU-DITHER CIRCUIT

[75] Inventor: Hirotaka Namioka, Yokohama, Japan

[73] Assignee: Kabushiki Kaisha Kenwood, Tokyo, Japan

[21] Appl. No.: 496,268

[22] Filed: Mar. 20, 1990

[30] Foreign Application Priority Data

Apr. 24, 1989 [JP] Japan ................................ 1-101598

[51] Int. Cl.$^5$ ............................................. H04K 1/10
[52] U.S. Cl. ........................................ 375/1; 380/34
[58] Field of Search .............................. 380/34; 375/1

[56] References Cited

U.S. PATENT DOCUMENTS

Re. 32,905  4/1989  Baran ................................... 375/1

Primary Examiner—Thomas H. Tarcza
Assistant Examiner—David Cain
Attorney, Agent, or Firm—Sixbey, Friedman, Leedom & Ferguson

[57] ABSTRACT

A tau-dither circuit in a spread spectrum communications system wherein a first PN code with a large phase change and a second PN code without a phase change are generated in the tau-dither circuit, and the first PN code is used as a PN code for synchronous tracking to a received signal whereas the second PN code is used as a PN code for despreading of the received signal.

3 Claims, 1 Drawing Sheet (PRIOR ART)

TAU-DITHER CIRCUIT

BACKGROUND OF THE INVENTION

1. Field of the Invention

The present invention relates to a tau-dither circuit used in a spread spectrum communications system.

2. Related Background Art

Demodulating a spread spectrum signal by using a tau-dither circuit has been carried out conventionally in the following manner as illustrated in the block diagram shown in FIG. 2. A received signal is multiplied at a multiplier 1 by a PN code which was phase-modulated by a phase modulator 10, to thereby despread the received signal. The output of the multiplier 1 is supplied to a demodulator 2 to demodulate it. The output of the multiplier 1 is also supplied via a band-pass filter 3 to a detector 4 which detects the envelope of the input signal. The envelope detected signal is multiplied at another multiplier 5 by a square wave reference signal outputted from a square wave reference signal oscillator 6, to thereby detect a phase difference between the received signal and PN code. The output of the multiplier 5, i.e., the detected phase difference error, is delivered to a loop filter 7 to obtain therefrom a dc output which is supplied to a voltage-controlled oscillator 8 as its control voltage. The output signal of the voltage-controlled oscillator 8 is supplied to a PN code generator 9 in the form of clock pulse. The PN code outputted from the PN code generator 9 is supplied to a delay circuit 11 and delayed by a predetermined amount. The delayed PN code from the delay circuit 11 and the PN code directly outputted from the PN code generator 9 and supplied to a switch 12. The switch 12 operates in response to the square wave reference signal from the square wave reference signal oscillator 6, to thereby phase-modulate the PN signal which is then supplied to the multiplier 1 for the despreading of the received signal. The delay circuit 11 and switch 12 constitute the phase modulator 10.

In the conventional tau-dither circuit described above, the same tau-dither circuit is used for both despreading of the received signal and synchronous tracking of the PN code to the received signal. Therefore, the conventional tau-dither circuit is associated with a contradictory problem that if the quality of the received signal after despreading is intended to be improved, the performance of synchronization retention of the PN code is degraded, or conversely if the performance of synchronization retention of the PN code is intended to be improved, the quality of the received signal after despreading is lowered.

SUMMARY OF THE INVENTION

It is an object of the present invention to improve the performance of synchronous retention of the PN code without degrading the quality (energy loss) of the received signal after despreading.

According to an aspect of the present invention, there is provided a tau-dither circuit in a spread spectrum communications system wherein a first PN code with a large phase change and a second PN code without a phase change are generated in the tau-dither circuit, the first PN code being used as a PN code for synchronous tracking to a received signal and the second PN code being use as a PN code for despreading of the received signal.

With the tau-dither circuit constructed as above, there are generated in the circuit the first PN code with a large phase change and the second PN code without a phase change, and the first PN code is used for synchronous tracking to the received signal, therefore the synchronous tracking of the PN code to the received signal can be improved. In addition, since the second PN code is used for despreading of the received signal, the received signal after despreading is hardly subjected to energy loss.

DETAILED DESCRIPTION OF THE PREFERRED EMBODIMENT

Figure 1:
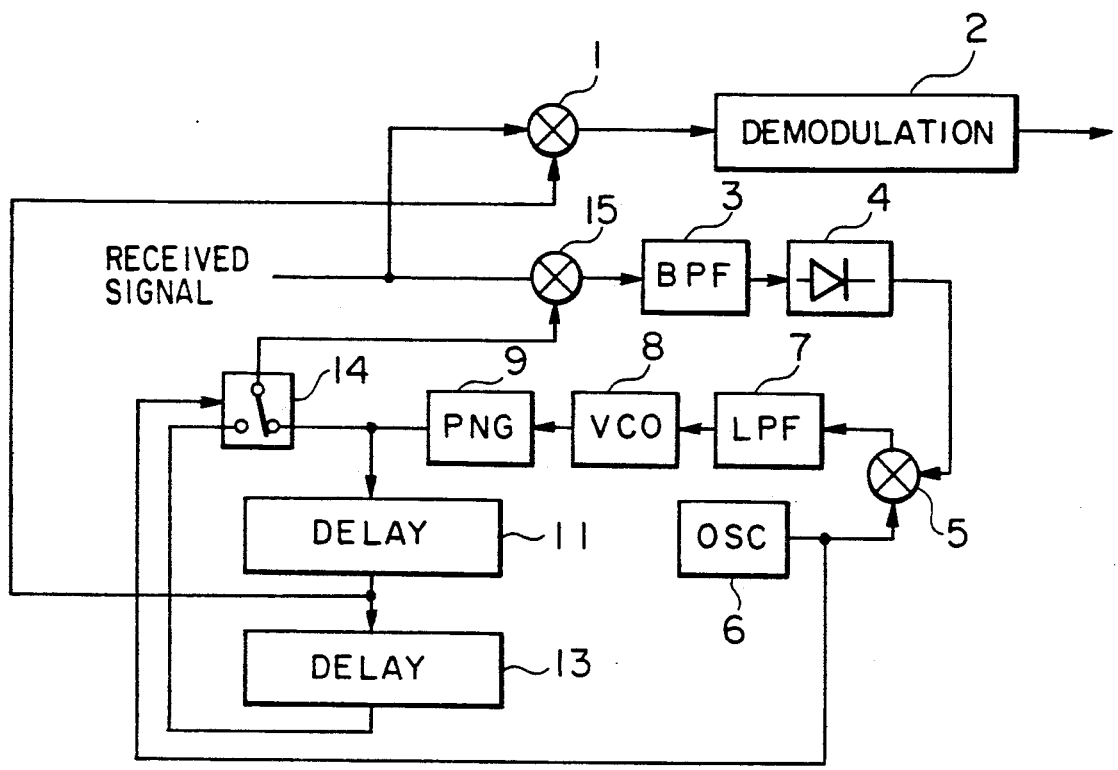
FIG. 1 is a block diagram showing an embodiment of the tau-dither circuit according to the present invention.
Figure 2:
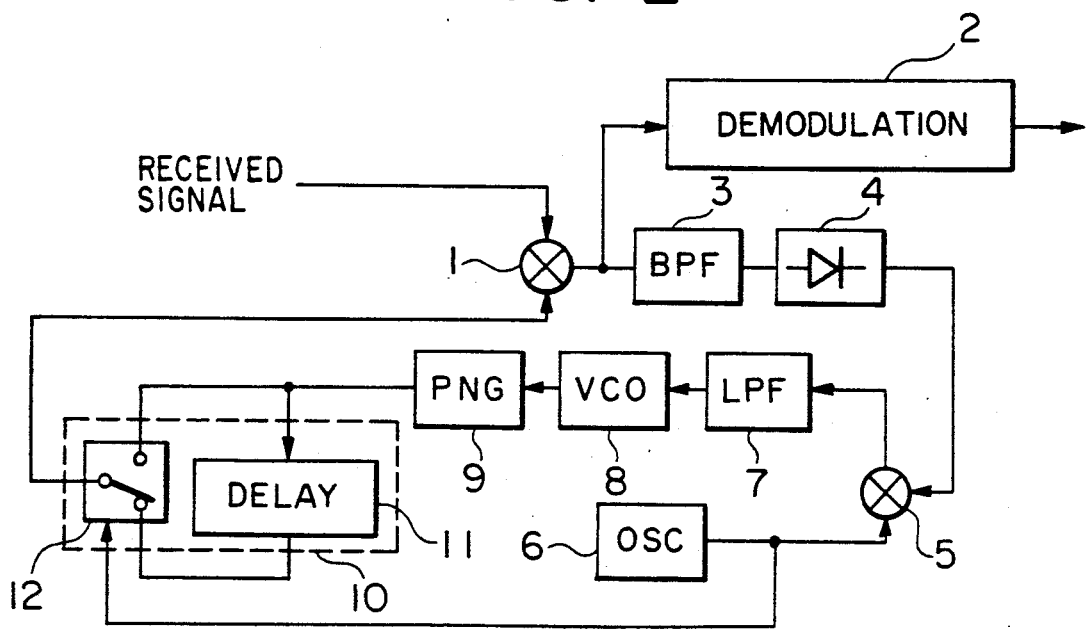
FIG. 2 is a block diagram showing a conventional tau-dither circuit.

A preferred embodiment of the tau-dither circuit of this invention will be described with reference to FIG. 1 wherein like circuit elements to those shown in FIG. 2 are represented by using identical reference numerals.

A PN code generated by a PN code generator 9 is supplied to a delay circuit 11. The PN code delayed at the delay circuit 11 is supplied to a multiplier 1 whereat it is multiplied by the received signal to despread the latter. The despread signal is then supplied to a demodulator 2 to demodulate the received signal. The delayed PN code at the delay circuit 11 is also supplied to another delay circuit 13 to further delay it. The delayed PN code from the delay circuit 13 and the PN code directly outputted from the PN code generator 9 are supplied to a switch 14. The switch 14 operates in response to a square wave reference signal from a square wave reference signal oscillator 6. The PN code selected by the switch 14 is supplied not to the multiplier 1 but to another multiplier 15 whereat it is multiplied by the received signal. The output of the multiplier 15 is delivered to a band-pass filter 3.

It is to be noted that tau-dither circuit is constructed of a circuit portion for making the PN code undergo synchronous tracking to the received signal and a circuit portion for performing despreading.

According to the above-described embodiment of this invention, in the circuit portion which is used for synchronous tracking of the PN code to the received signal, the PN code directly outputted from the PN code generator 9 and the PN code outputted from the PN code generator 9 and delayed by a predetermined amount at both the delay circuits 11 and 13, are selectively switched in response to an output signal from the square wave reference signal oscillator 6. Accordingly, the phase change of the PN code supplied to the multiplier 15 becomes large.

Further in the circuit portion which is used for despreading of the received signal, the PN signal outputted from the PN code generator 9 is delayed by a predetermined amount only at the delay circuit 11 and supplied to the multiplier 1. Accordingly, there is no phase change in the PN code supplied to the multiplier 1.

As appreciated from the foregoing description of this invention, a PN code having a large phase change is supplied to the loop circuit which is used for synchronous tracking of the PN code to the received signal, so that the synchronous retention of the PN code relative to the received signal can be improved while maintaining stable operation even at a low C/N. In addition, the PN code for the despreading of the received signal has least phase change, so that the received signal after despreading is hardly subjected to energy loss. It is therefore possible to realize high quality communications with a high performance demodulator.

While the presently preferred embodiment of the present invention have been shown and described, it is to be understood that this disclosure is for the purpose of illustration and that various changes and modifications may be made without departing from the scope of the invention as set forth in the appended claim.

What is claimed is:

1. A tau-dither circuit in a spread spectrum communication system comprising:

means (1, 2) for producing a first output representative of a correlation between a received spectrum spread signal and a first PN code sequence signal and demodulating said first output;

means (3, 4, 5, 15) for producing a second output representative of a correlation between the received spectrum spread signal and a second PN code sequence signal and phase-detecting said second output;

a PN code (9) sequence generator controlled by said phase-detected output for generating a PN code sequence signal;

means (11) for generating said first PN code sequence signal by applying a first predetermined phase-delay to said PN code sequence signal; and means (11, 13, 14) for generating said second PN code sequence signal by applying a dithering to said PN code sequence signal with a second predetermined phase-delay.

2. A tau-dither circuit according to claim 1, wherein said second predetermined phase-delay is larger than said first predetermined phase-delay.

3. A tau-dither circuit according to claim 2, wherein said phase-detecting means (3, 4, 5) performs the phase-detecting by taking a multiplication of a dithering period signal and said second output.

* * * * *